United States Patent [19]
Su

[11] Patent Number: 6,036,283
[45] Date of Patent: Mar. 14, 2000

[54] BRAKE LIQUID PRESSURE DEVICE

[76] Inventor: Jin-Cherng Su, No. 92, Pao An Rd., Lu Chu Hsiang, Kaohsiung Hsuan, Taiwan

[21] Appl. No.: 09/071,362

[22] Filed: Apr. 30, 1998

[51] Int. Cl.[7] .................................................. B60T 13/00
[52] U.S. Cl. ........................................ 303/9.62; 303/9.74
[58] Field of Search ................................. 303/9.62, 9.73, 303/9.74, 9.75, 84.2, 113.1, 113.5; 137/460, 599, 508, 493.9, 493.3, 498

[56] References Cited

U.S. PATENT DOCUMENTS

| | | | |
|---|---|---|---|
| 3,354,638 | 11/1967 | Kersting | 303/9.73 X |
| 3,375,852 | 4/1968 | Milster | 303/493.3 |
| 3,759,288 | 9/1973 | Kobashi | 137/498 |
| 4,976,281 | 12/1990 | Berglund | 137/460 |
| 5,390,987 | 2/1995 | Willi et al. | 303/9.62 |

*Primary Examiner*—Chris Schwartz
*Assistant Examiner*—Melanie Talavera
*Attorney, Agent, or Firm*—Pro-Techtor International Services

[57] ABSTRACT

A brake liquid pressure device includes a piston valve for increasing brake liquid pressure instantly, by augmenting a front stage brake liquid pressure at first, and then augmenting the front stage and the rear stage liquid pressure evenly at the same time so as to perform braking on the front wheels first, and then on all the front and the rear wheels evenly at the same time, moving the center of gravity of a car to the front stage so as to shortening a brake distance.

13 Claims, 19 Drawing Sheets

BRAKE LIQUID PRESSURE DEVICE

BACKGROUND OF THE INVENTION

This invention relates to a brake liquid pressure device, particularly to one capable to shorten a braking distance.

Conventional automobiles are generally provided with a brake liquid pressure main pump connected with a front and a rear main tube route and four brake dividing pumps for shortening a brake distance, and thus minimizing car accidents, and nowadays electronic brake systems are often used to control those pumps, but their cost is high, not affordable for common cars.

SUMMARY OF THE INVENTION

The purpose of the invention is to offer brake liquid pressure device including a piston valve to be connected to brake liquid routes for augmenting brake liquid pressure instantly to be transmitted to the liquid dividing pumps of the front stage (i.e. the front wheels) so as to brake a little the front wheels first and then brake all the four wheels evenly at the same time and thus shortening a brake distance.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
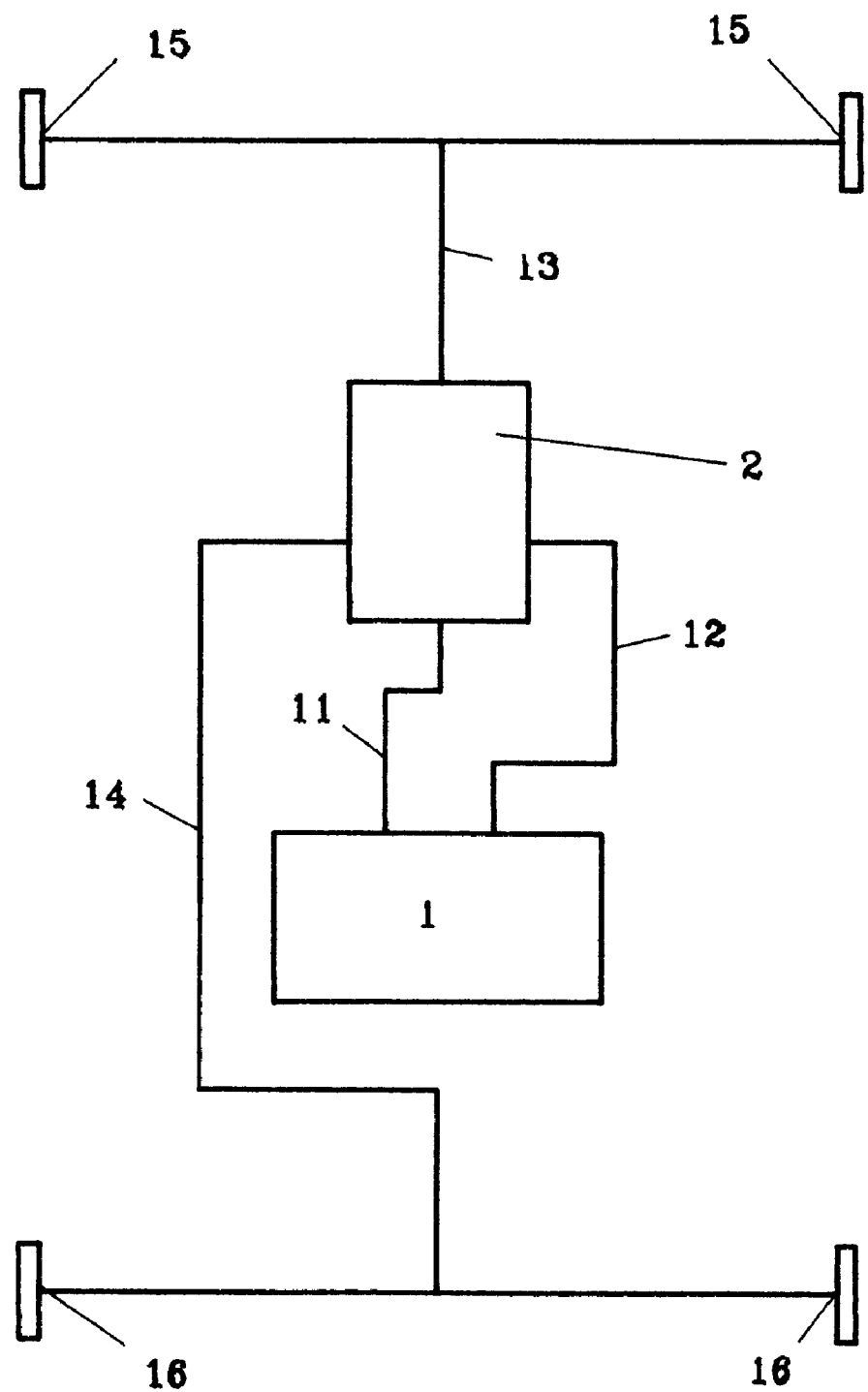
FIG. 1 is a diagram of a brake liquid pressure route including a brake liquid pressure device in the present invention.
Figure 2:
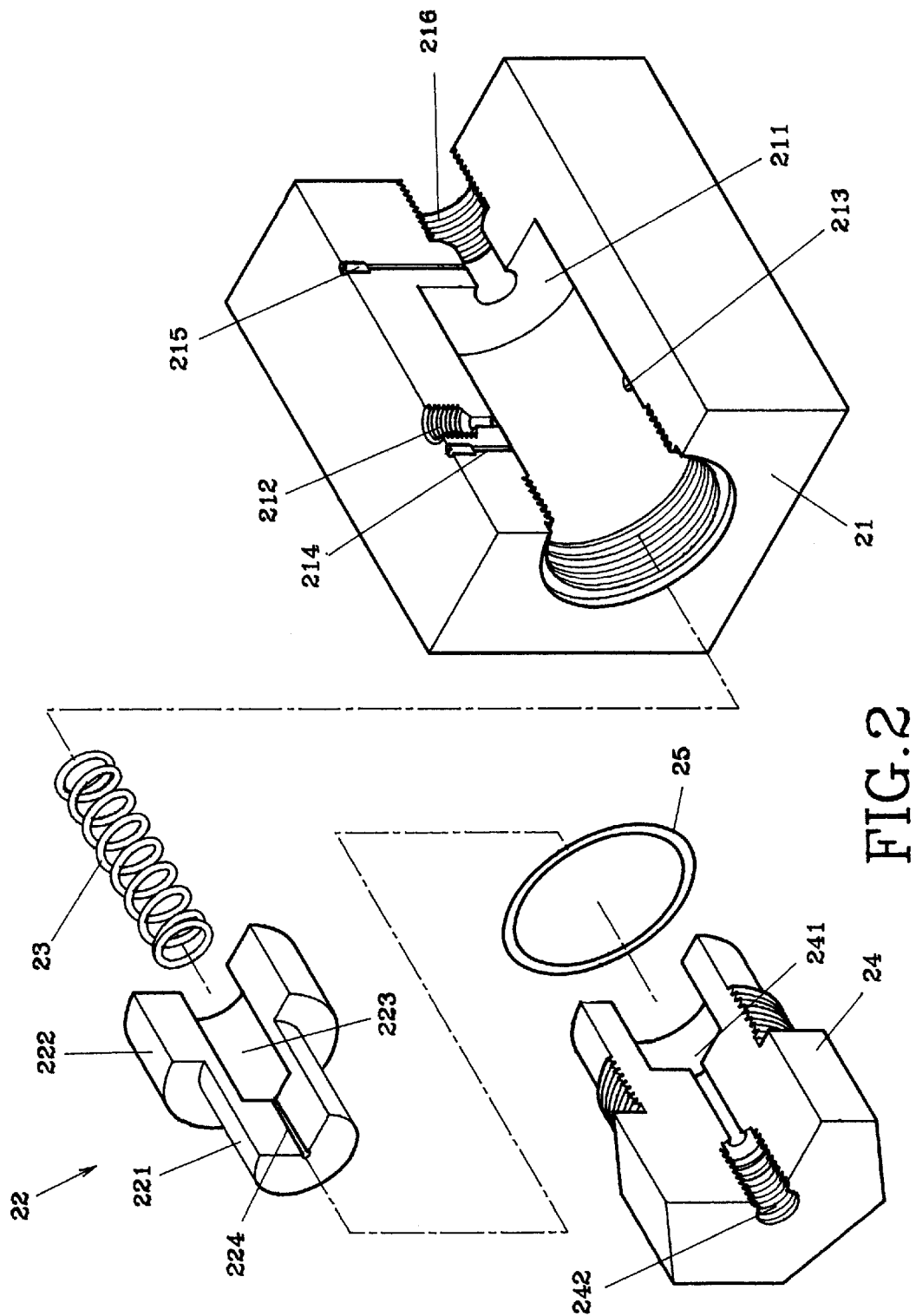
FIG. 2 is an exploded perspective view of a first embodiment of a piston valve in the present invention.
Figure 3:
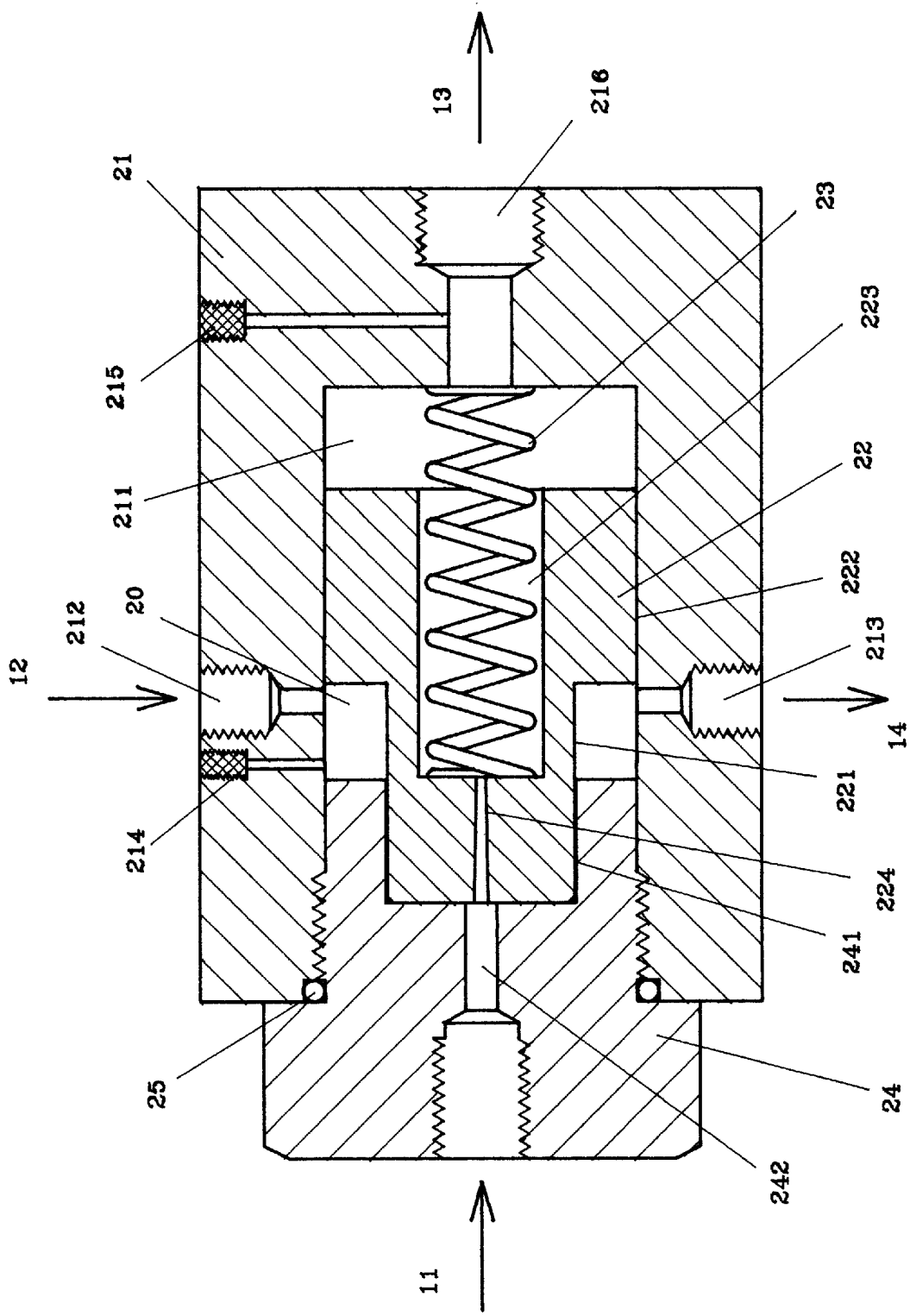
FIG. 3 is a side cross-sectional view of a first embodiment of a piston valve in the present invention.

A first embodiment of a brake liquid pressure device in the present invention, as shown in FIG. 1, 2 and 3, includes a piston valve 2 having a front stage inlet 242, a rear stage inlet 212, a front stage outlet 216 and a rear stage outlet 213. A first main tube route 11 of a brake pressure main pump 1 is connected to the front liquid inlet 242, and a second main tube route 12 the main pump 1 is connected to the rear stage inlet 212. A front stage tube route 13 is connected to the front stage outlet 216, which is then connected to a front brake liquid dividing pump 15. A rear stage tube route 14 is connected to the rear stage outlet 213, which is then connected to a rear brake liquid dividing pump 16. If the brake of an automobile is operated to force the main pump 1 produce liquid pressure, brake liquid flows to add pressure to the piston valve 2, flowing out of the piston valve 2 through the front stage outlet 216 and the rear stage outlet 213, through the front stage tube route 13 and the rear stage tube route 14, and to the front stage liquid dividing pump 15 and the rear stage liquid dividing pump 16.

Figure 4:
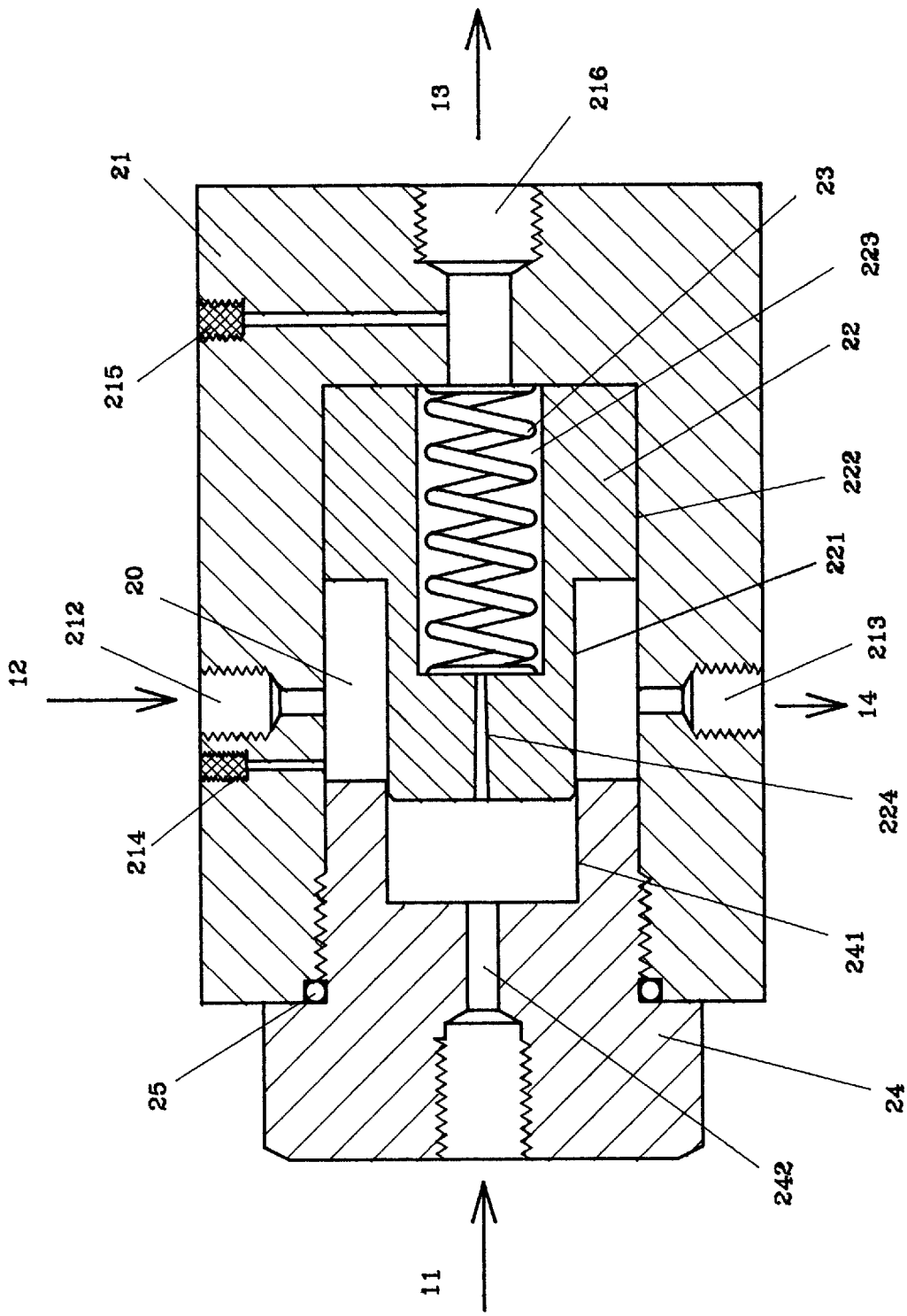
FIG. 4 is a side cross-sectional view of the first embodiment of a piston valve in the present invention, showing a pressing piston moved forward.

The piston valve 2 consists of a piston base 21, a piston 22, a coil spring 23, and a threaded cap 24, combined together as shown in FIG. 2, 3 and 4.

The base 21, as shown in FIGS. 2, 3 and 4, has a a center circular hollow 211 extending lengthwise and having an opening in a left side for containing the coil spring 23 and the piston 22. The threaded cap 24 threadably closes the opening of the hollow 211, with an anti-leak gasket 25 fitting around the opening to prevent liquid leak. An annular liquid space 20 is formed between the hollow 211 and the piston together with the threaded cap 24. The rear stage inlet 212 and a first leak hole 214 are located in an upper wall of the base 21 on a front portion 221 of the piston 22, and the rear stage outlet 213 is located in a lower wall of the base 21 under front portion 221. The front stage outlet 216 is located in the center of a rear wall of the base 21 behind the hollow 211, and a second leak hole 215 is provided in the upper wall of the base 21, communicating with the front stage outlet 216.

The piston 22, as shown in FIGS. 2, 3 and 4, is movably contained in the circular hollow 211 of the base 21, having the front small diameter 221 and a rear large diameter portion 222, a center spring hole 223 and a small center hole 224 in the front portion 221, which inserted in a rear center hole 241 of the threaded cap 24. The small center hole 224 communicates with the front stage liquid inlet 242 of the threaded cap 24.

The coil spring 23, as shown in FIGS. 2, 3 and 4, has a front portion fitted in the spring hole 223 of the piston 22 and a rear portion resting on a wall defining the hollow 211 around an inner opening of the front stage outlet 216.

The threaded cap 24, as shown in FIGS. 2, 3 and 4, has a center rear hole 241 formed in a rear small diameter portion for the front portion 221 of the piston 22 to fit therein, and a front large hexagonal portion, the front stage inlet formed in the front large portion, male threads formed in the rear small diameter portion and engaging with female threads of the hollow of the base with a gasket fitted around the opening of the hollow and communicating with the rear hole 241 and having a larger diameter than that of the small center hole 224 of the piston 22 and communicating with the small center hole 224. Further, the gasket 25 is located at the opening of the hollow 211 of the base 21 and pressed by the threaded cap 24.

In assembling, firstly, the piston 22 and the coil spring 23 are inserted in the center circular hollow 211 of the base 21, and the threaded cap 24 is threadably combined with the base 21, closing up the hollow 211 to keep the coil spring 23 and the piston 22 therein. Then the front small diameter portion 221 of the piston 22 is inserted in the rear center hole 241, with the rear large diameter portion 222 fitting in the hollow 211 so that the hollow 211 and the piston 22 together with the threaded cap 24 form the liquid space 20. So when brake liquid flows in the piston valve 2, air in the piston valve 2 is pushed out through the first and the second leak holes 214, 215, as shown in FIG. 3, with the two leak holes 214, 215 blocked up by the piston 22. Then when brake liquid enters the main pump 1 to produce liquid pressure, brake liquid flows in the piston valve 2, through the front stage liquid inlet 242, pressing back the front portion 221 of the piston 22. And at the same time, brake liquid flows through the rear stage liquid inlet 212 into the liquid space 20 and press the large portion 222 of the piston 22 so that the liquid filling the space between the large portion 222 and the spring 23 may flow through the front stage outlet 216 and through the front stage tube route 13 to reach the brake liquid dividing pump 15, as shown in FIG. 4. Then pressure in the front stage tube route 13 is swiftly increased by the piston 22 to perform braking, with the brake liquid in the front brake dividing pump 15 reaching the necessary volume, but when the rear brake liquid in the rear brake dividing pump 16 still does not yet reach the needed preset volume, the brake liquid main pump 1 continues to pump liquid through the front stage inlet 242 and the through hole 224 of the piston 22 into the spring hole 223. At that time, the front stage brake liquid dividing pump 15 is already filled with the necessary volume of brake liquid, so the liquid in the rear stage tube route 14 and pushes back the piston 22 the original position together with resilience of the spring 23 as shown in FIG. 3, forcing the brake liquid in the hollow space 20 swiftly flow through the rear stage outlet 213 into the rear stage tube route 14 performing braking to the front stage at first and then the front and the rear stage synchronously next, shortening the braking distance.

The brake liquid device in the invention may be installed in various types of automobiles as described below.

Figure 5:
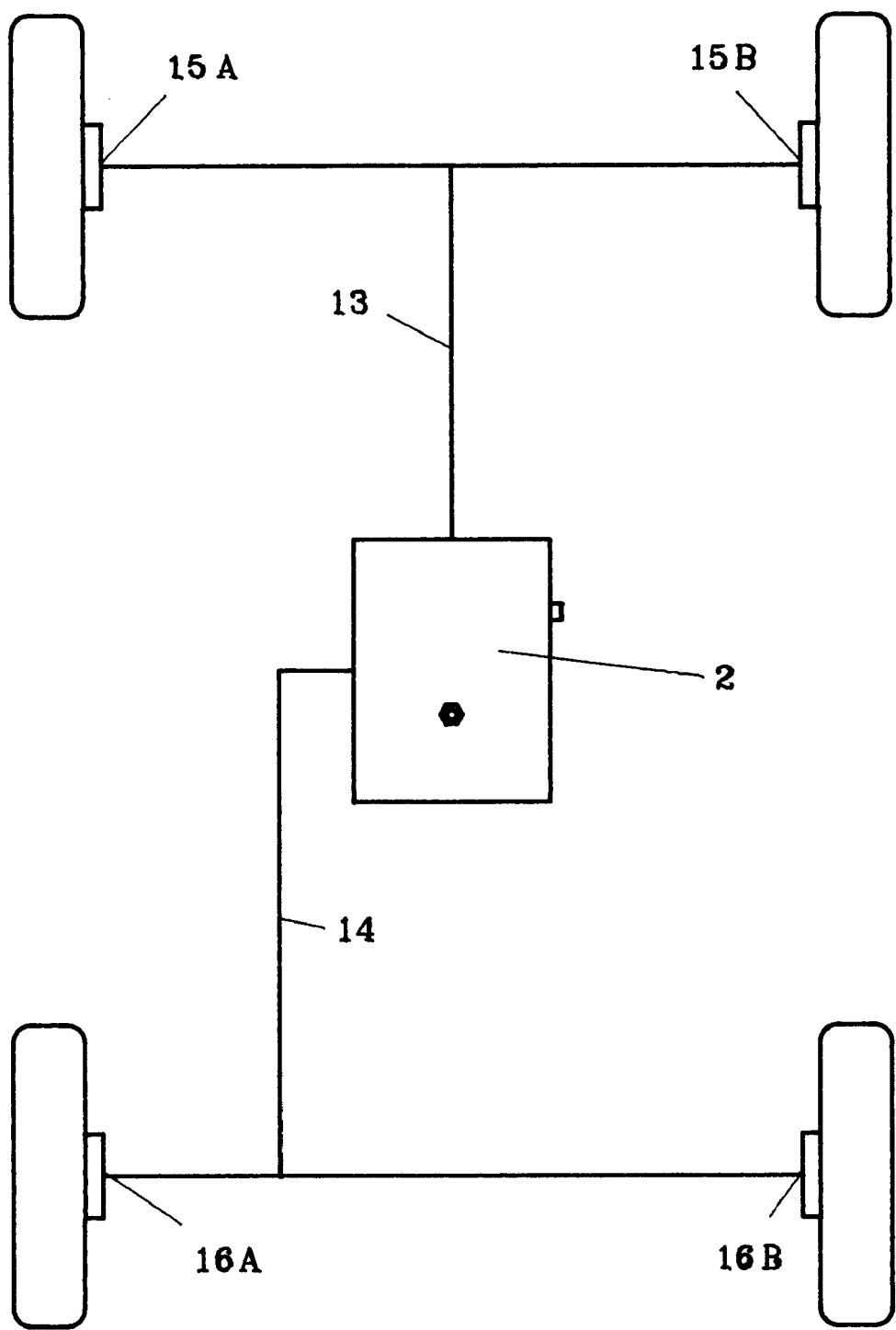
FIG. 5 is a first diagram of the piston valve installed in an automobile.

1. Referring to FIG. 5, the front stage tube route 13 of the piston valve 2 is connected with two brake liquid dividing pumps 15A and 15B of the two front wheels of a car. Then the rear stage tube route 14 is connected with the two brake liquid dividing pumps 16A and 16B of the rear wheels. Thus the two front wheels are at first braked a little, then the two front and the two rear wheels are braked evenly at the same time.

Figure 6:
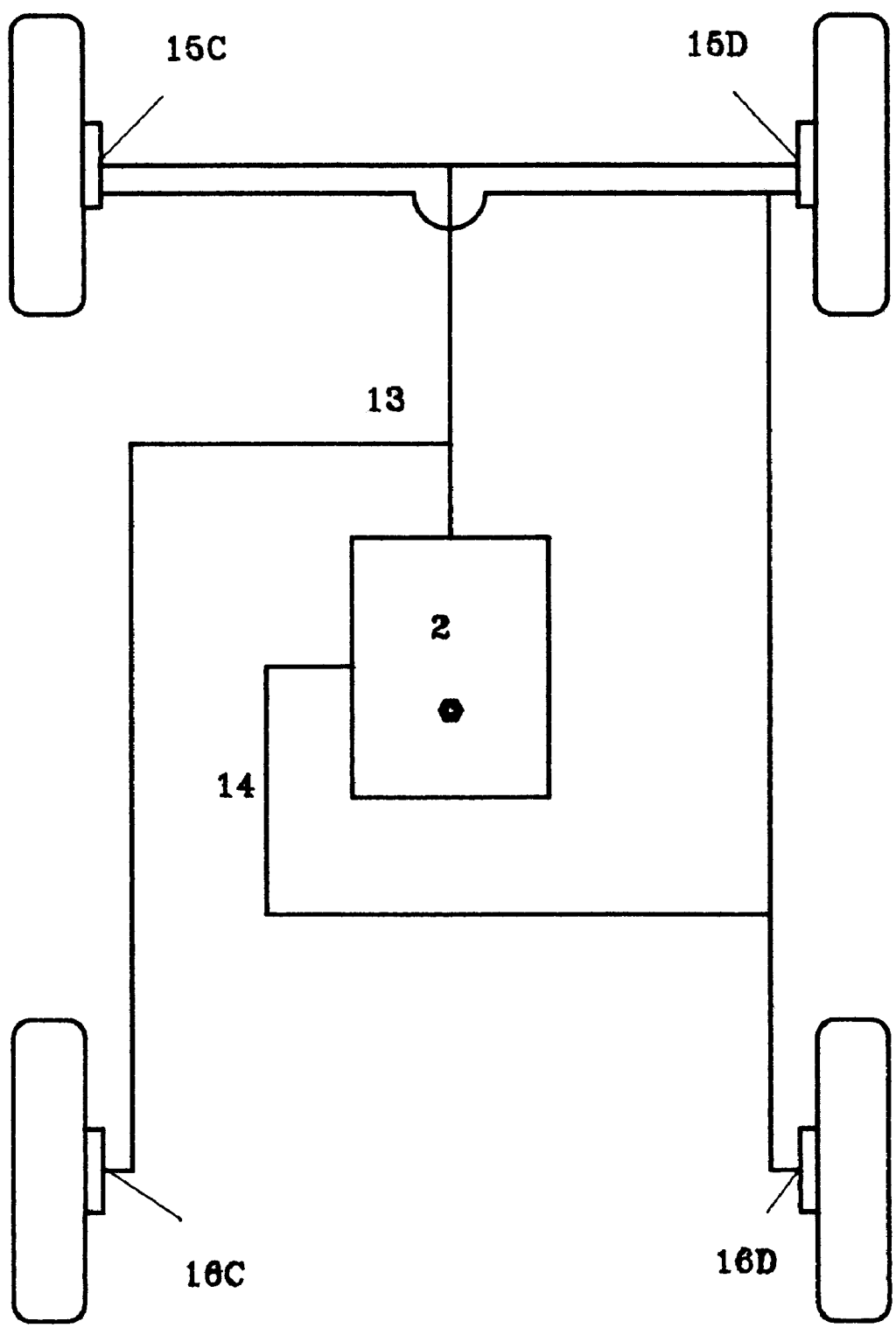
FIG. 6 is a second diagram of the piston valve installed in an automobile.

2. Referring to FIG. 6, the front stage tube route 13 is connected with brake liquid dividing pumps 15C, 15D and 16D of both the two front wheels and a right rear wheel, and the rear stage tube route 14 is connected with brake liquid dividing pumps 15C, 15D and 16C of both the two front wheels and a left rear wheel, performing braking a little at first on the two front wheels and the right rear wheel, and then on all the four wheels evenly at the same time.

Figure 7:
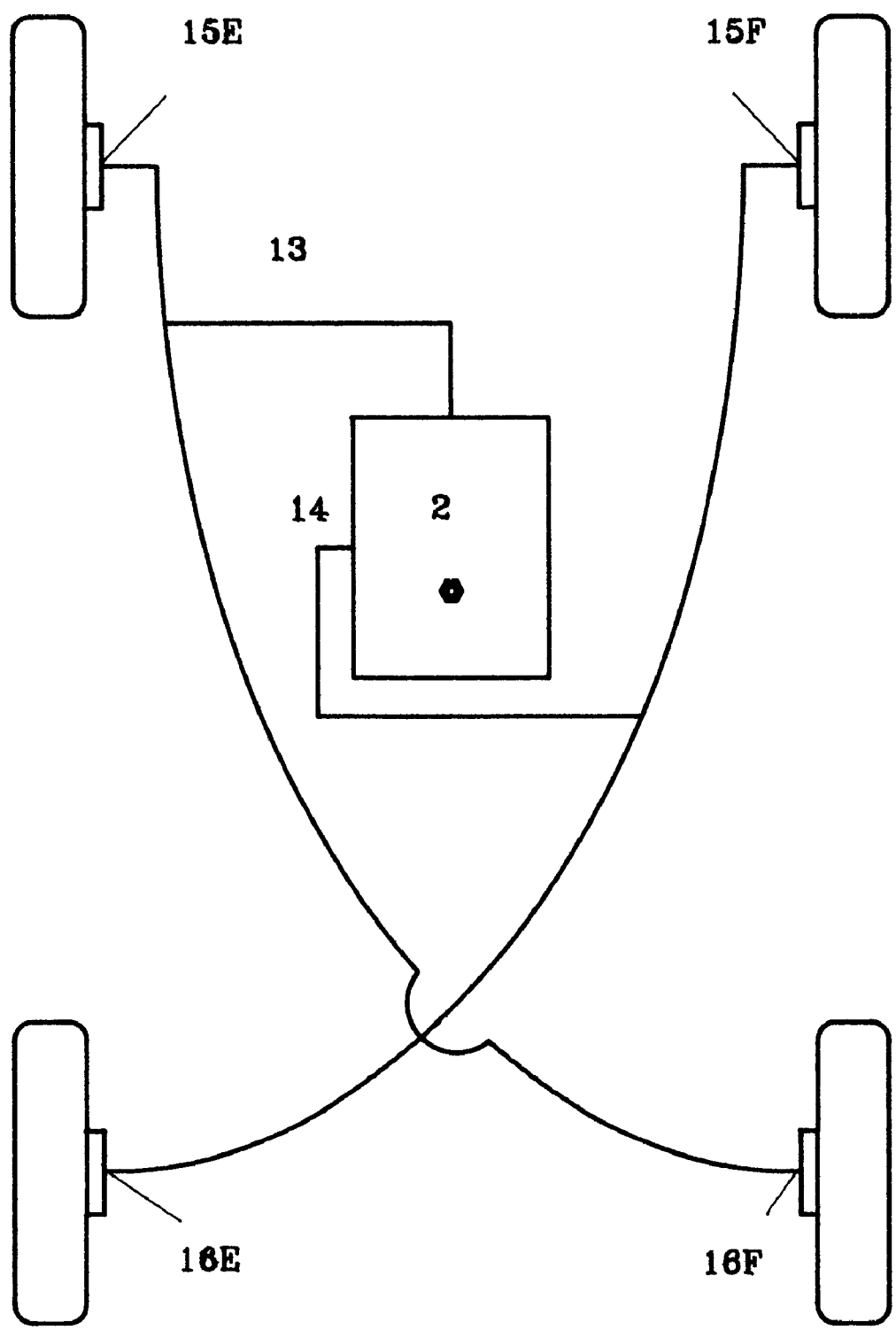
FIG. 7 is a third diagram of the piston valve installed in an automobile.

3. Referring to FIG. 7, the front stage tube route 13 is connected with the brake liquid dividing pumps 15E and 16F of the front left wheel and the rear right wheel, and the rear stage tube route 14 is connected with the brake liquid dividing pumps 15F and 16E of the front right wheel and the rear right wheel so that the the front left wheel and the rear right wheel are at first braked a little and then all the four wheels are braked evenly at the same time.

Figure 8:
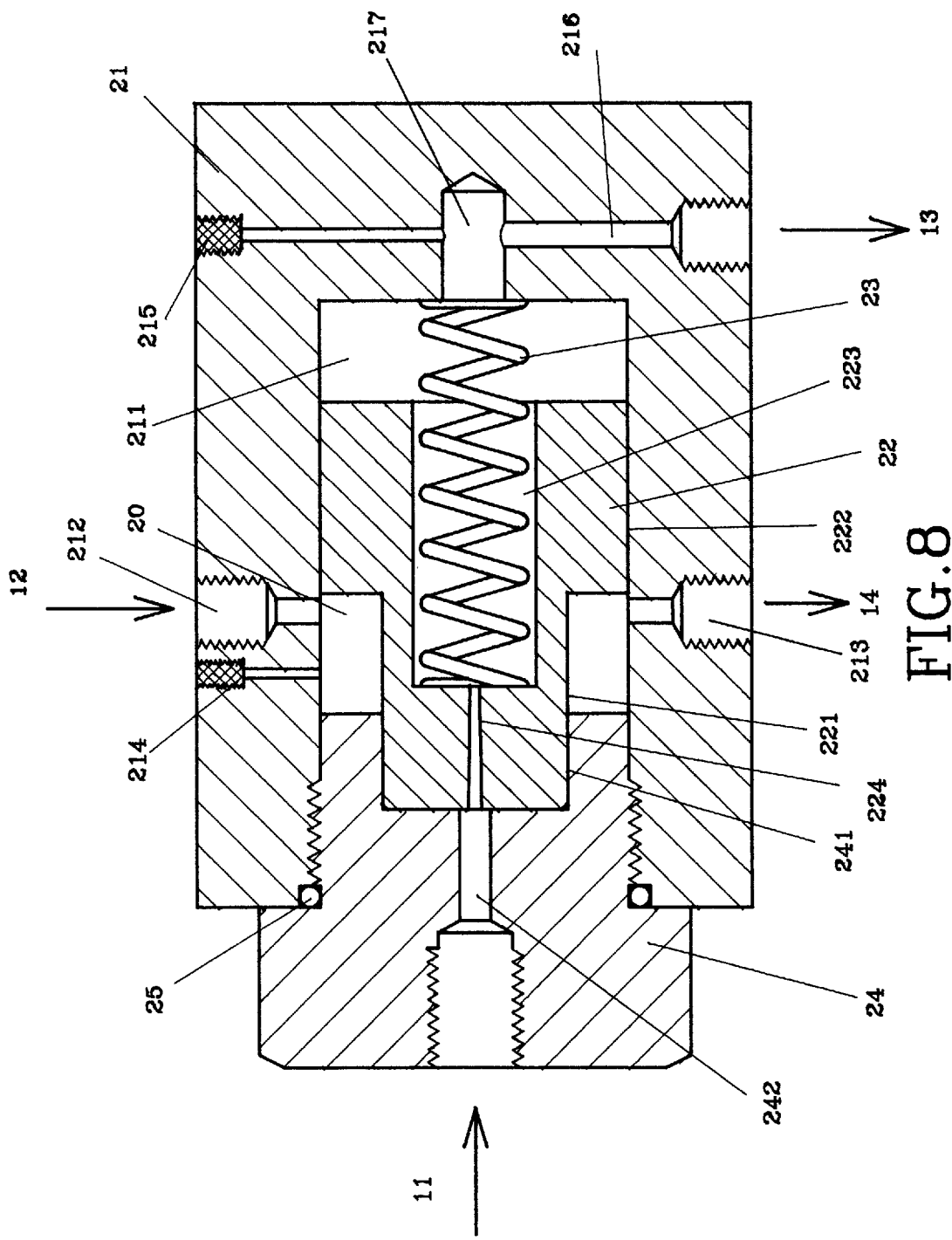
FIG. 8 is a side cross-sectional view of a second embodiment of a piston valve in the present invention.

FIG. 8 shows a second embodiment of a brake liquid pressure device in the present invention, having the same structure as the first embodiment except that the base 21 has a center lengthwise groove 217 behind the center circular hollow 211, with the second leak hole 215 in an upper wall of the base 21 communicating with the groove 217 and the front stage outlet 216 in a lower wall of the base 21 also communicating with the groove 217.

Figure 9:
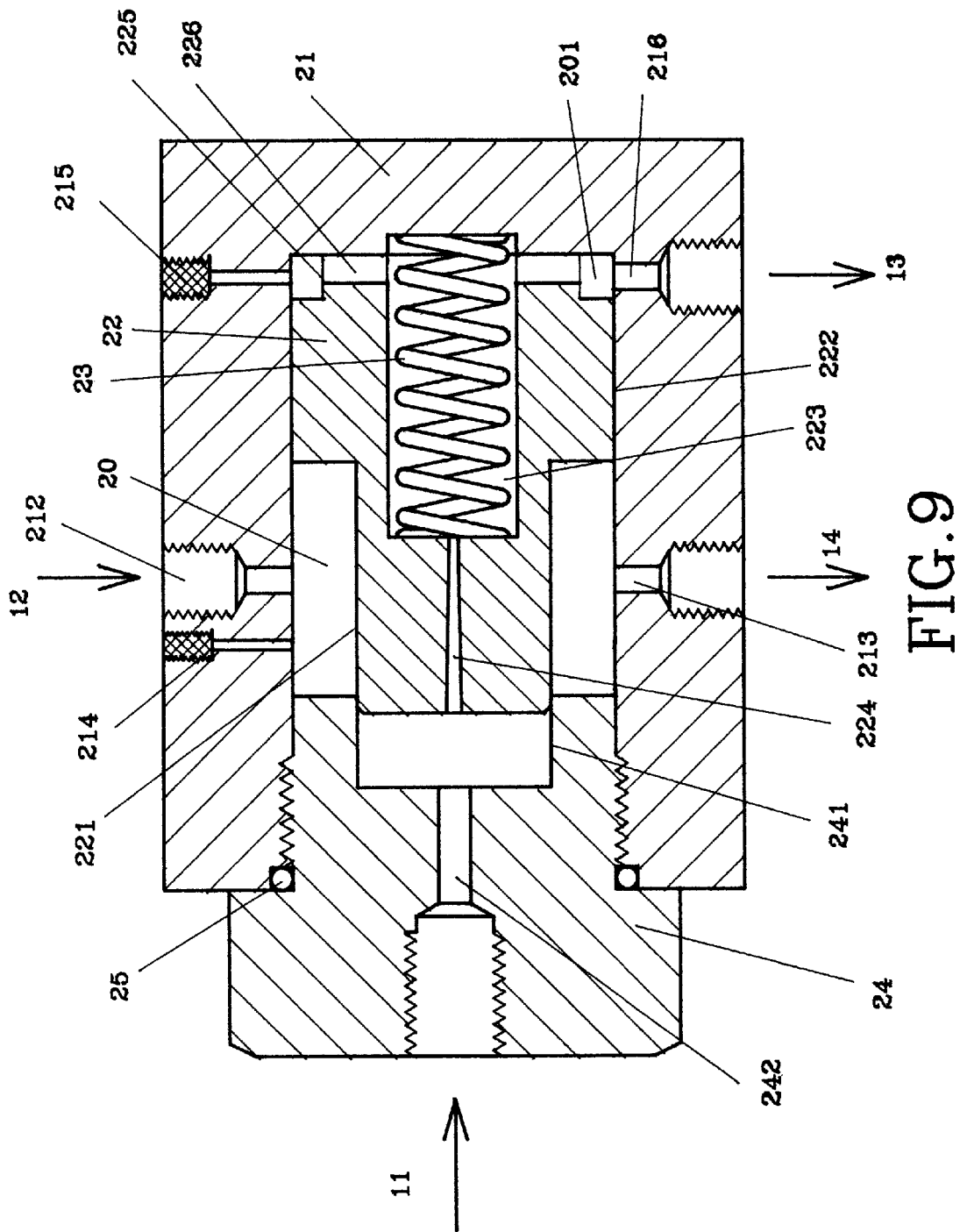
FIG. 9 is a side cross-sectional view of a third embodiment of a piston valve in the present invention.

FIG. 9 shows a third embodiment of a brake liquid pressure device in the present invention, having the same structure as the first embodiment except that the base 21 has the second leak hole 215 in the upper wall communicating with a rear end of the center circular hollow 211 and the front stage outlet 216 in the lower wall of the base 21 communicating with the rear end of the hollow 211, and a small diameter tube fixed on an end surface of the rear large portion 222 of the piston 22, with a chamber 201 formed between the tube 225 and the rear large portion 222 together with the hollow 211, and a groove 226 formed between the edge of the tube 225 and the spring hole 223 to communicate the spring hole 223 with the chamber 201.

Figure 10:
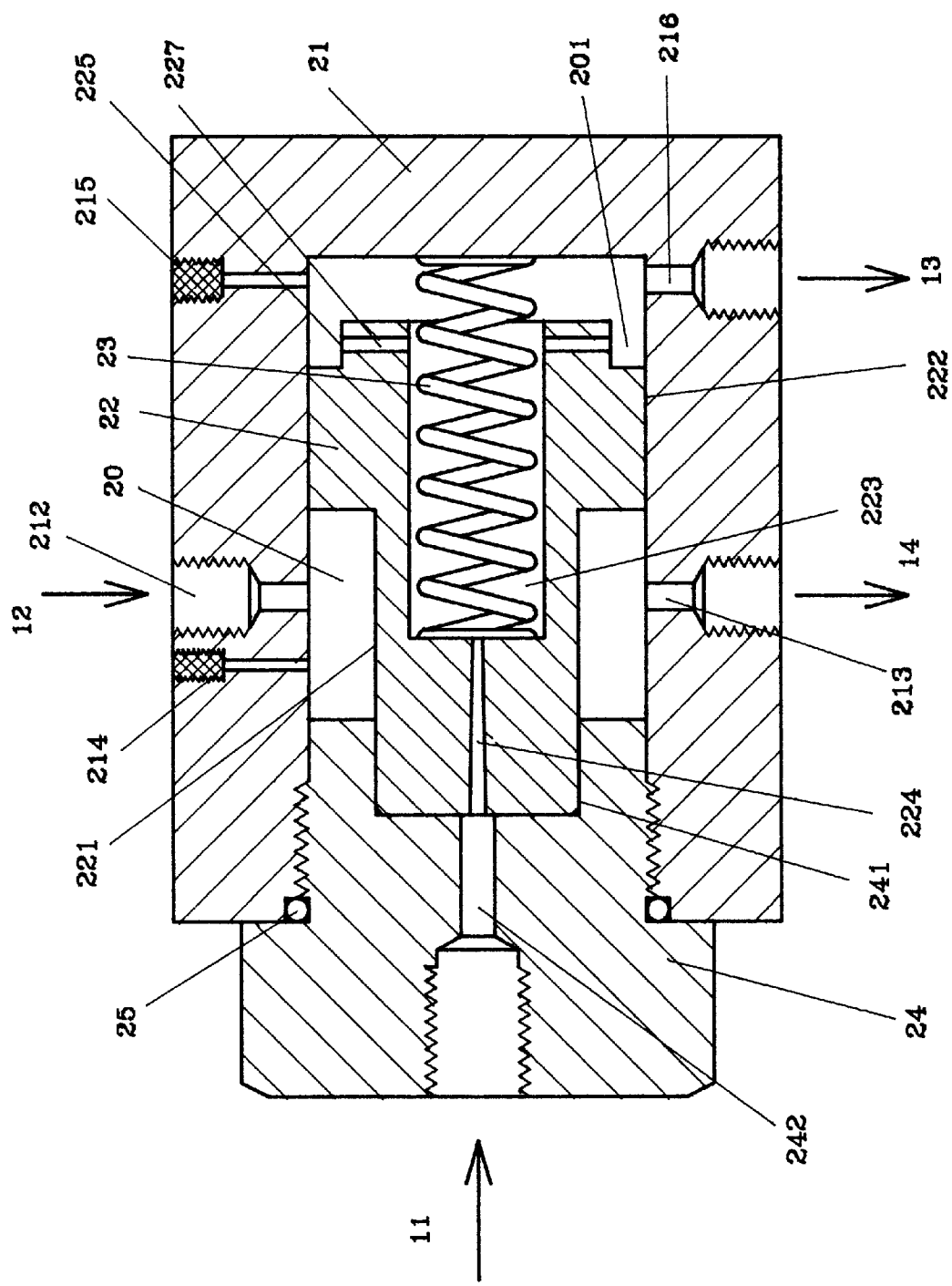
FIG. 10 is a side cross-sectional view of a fourth embodiment of a piston valve in the present invention.

FIG. 10 shows a fourth embodiment of a brake liquid pressure device in the present invention, having the same structure as the third embodiment except that the base 21 has a through hole 227 instead of the groove 226 in the third embodiment.

Figure 11:
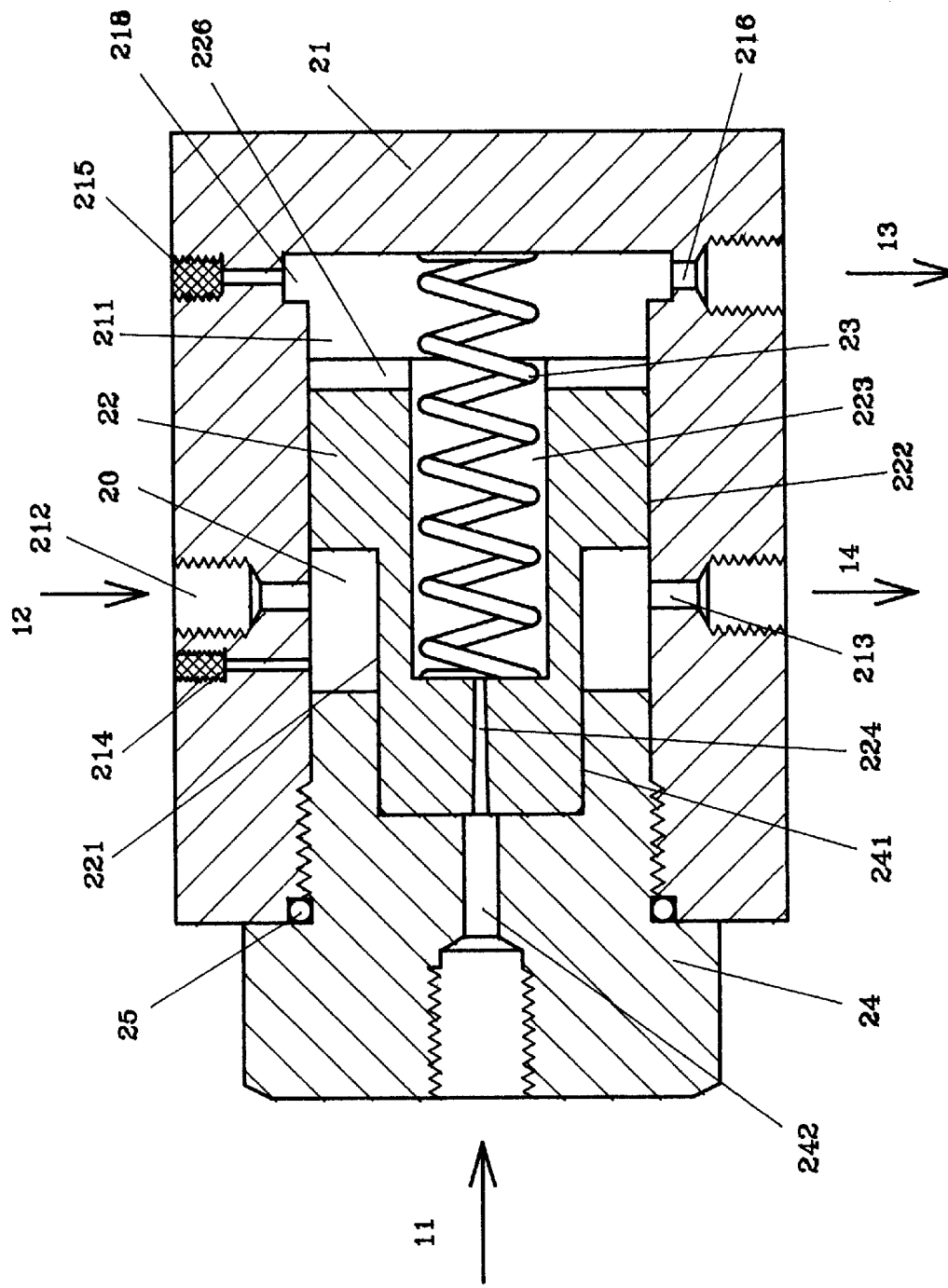
FIG. 11 is a side cross-sectional view of a fifth embodiment of a piston valve in the present invention.

FIG. 11 shows a fifth embodiment of a brake liquid pressure device in the present invention, having the same structure as the fourth embodiment except that the base 21 has an annular groove 218 provided in the wall defining the rear end of the hollow 211 and the second leak hole 215 and the front stage pressure outlet 216 both communicating with the annular groove 218, and a groove 226 in a rear end surface of the large portion 222 of the piston 22 for communicating the annular groove 218 with the spring hole 223.

Figure 12:
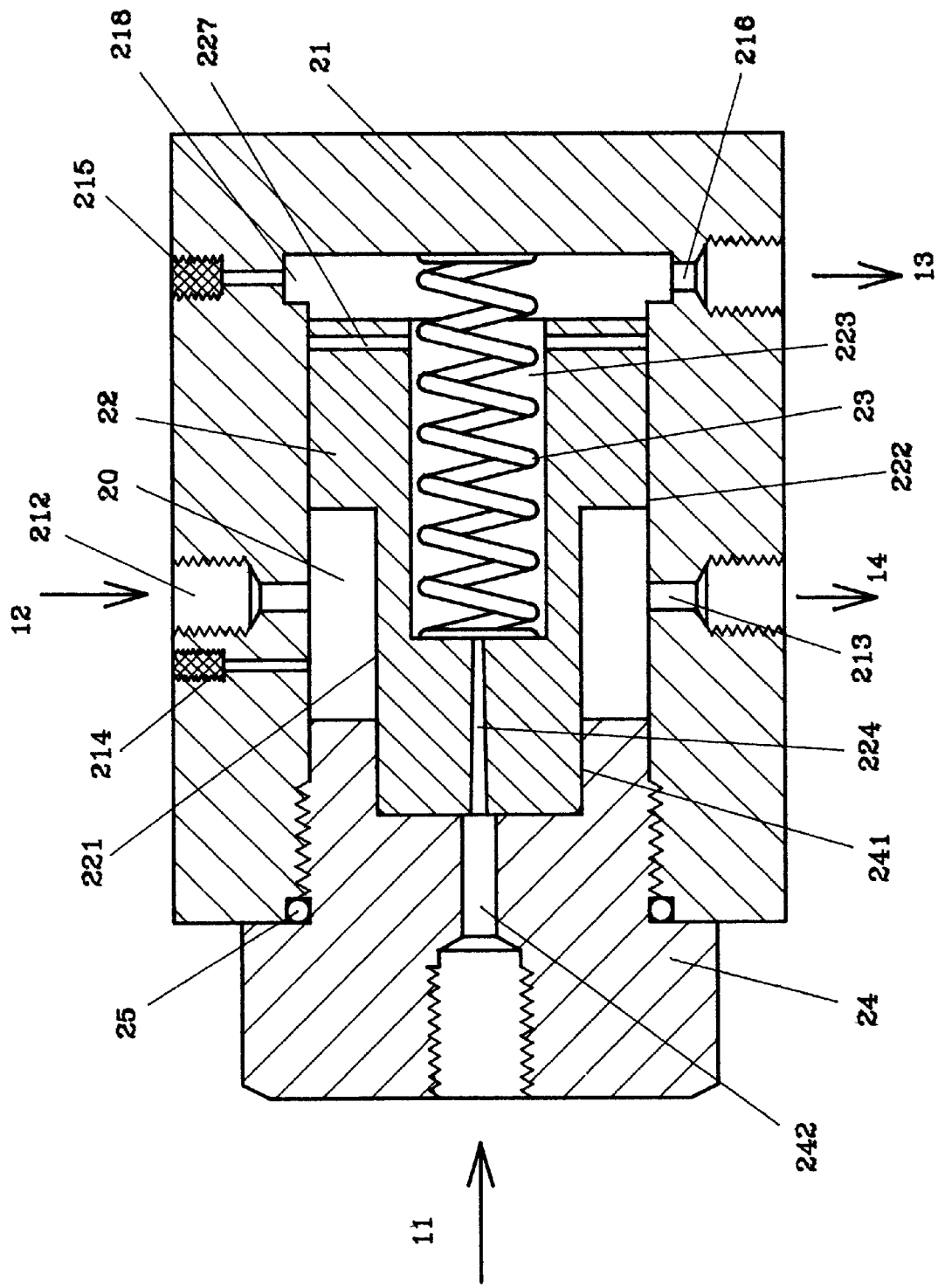
FIG. 12 is a side cross-sectional view of a sixth embodiment of a piston valve in the present invention.

FIG. 12 shows a sixth embodiment of a brake liquid pressure device in the present invention, having the same structure as the fifth embodiment except that the piston 22 has a through hole 227 in the rear end of the large portion 222 communicating with the annular groove 218.

Figure 13:
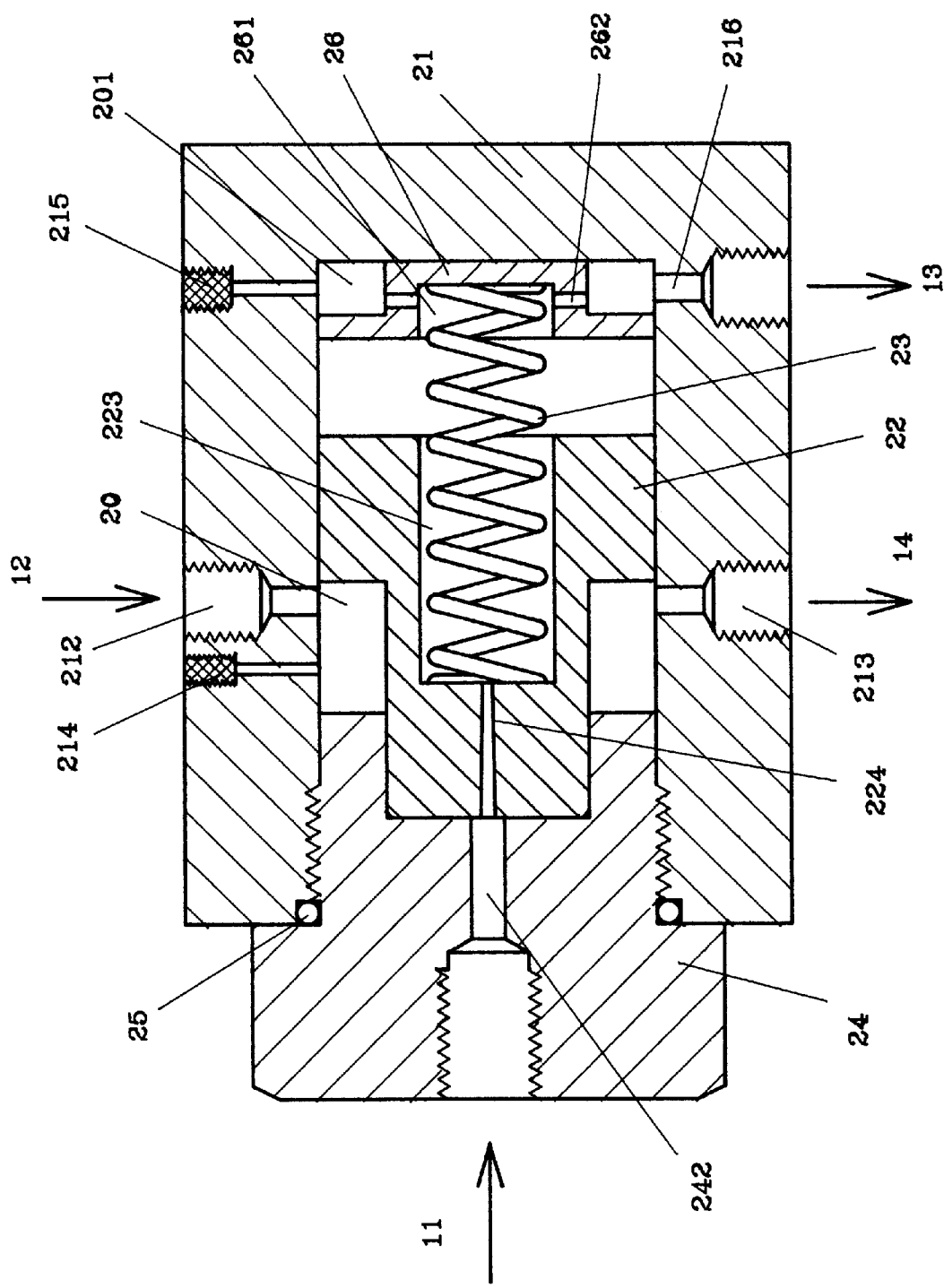
FIG. 13 is a side cross-sectional view of a seventh embodiment of a piston valve in the present invention.

FIG. 13 shows a seventh embodiment of a brake liquid pressure device in the present invention, having the same structure as the fourth embodiment except that the base 21 has a cap-shaped pad 26 fitted tightly in a rear end of the hollow 211 and having a center recess 261 for containing the rear end of the spring 23, with a chamber 201 formed between the pad 26 and the hollow 211, and the pad 26 has a through hole 262 communicating with the chamber 201.

Figure 14:
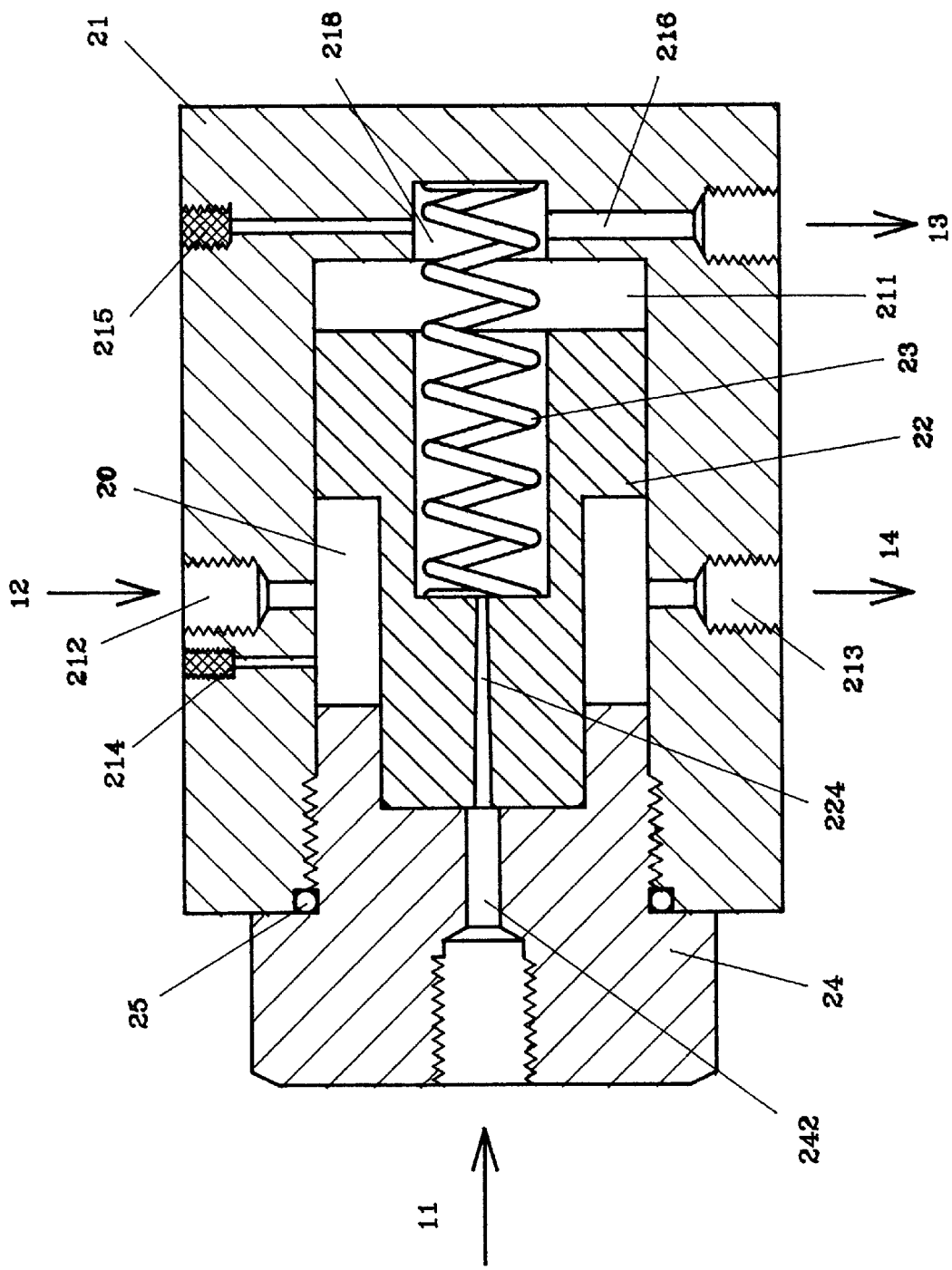
FIG. 14 is a side cross-sectional view of an eighth embodiment of a piston valve in the present invention.

FIG. 14 shows an eighth embodiment of a brake liquid pressure device in the present invention, having the same structure as the second embodiment except that the base 21 has a small diameter spring recess 218 in the wall defining the rear end of the hollow 211 for the rear end of the spring 23 to fit therein, and the second leak hole 215 and the front stage outlet 216 communicate with the recess 218.

Figure 15:
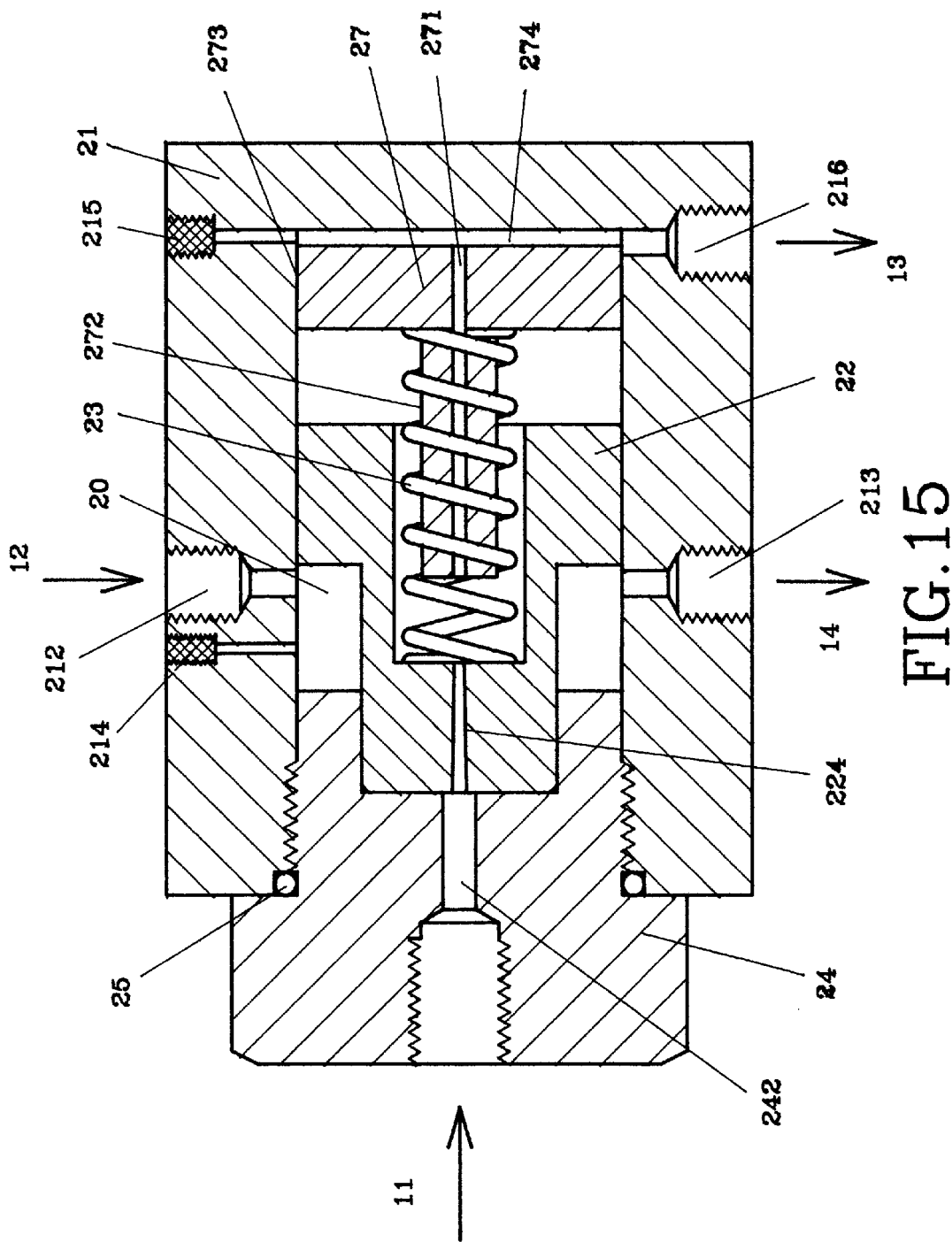
FIG. 15 is a side cross-sectional view of a ninth embodiment of a piston valve in the present invention.

FIG. 15 shows a ninth embodiment of a brake liquid pressure device in the present invention, having the same structure as the second embodiment except that the base 21 has the second leak hole 215 and the front stage outlet 216 communicating with the hollow 211, a disc 27 disposed in the rear end of the hollow 211 and having a center through hole 271, a round bar 272 formed to extend from the front center surface of the disc 27 and having a little smaller diameter than the spring 23 to fit in the spring 23. The outer periphery 273 of the disc 27 fits around the inner surface of the hollow 211, and a straight groove 274 is provided in the rear surface of the disc 27 to communicate with the front stage outlet 216.

Figure 16:
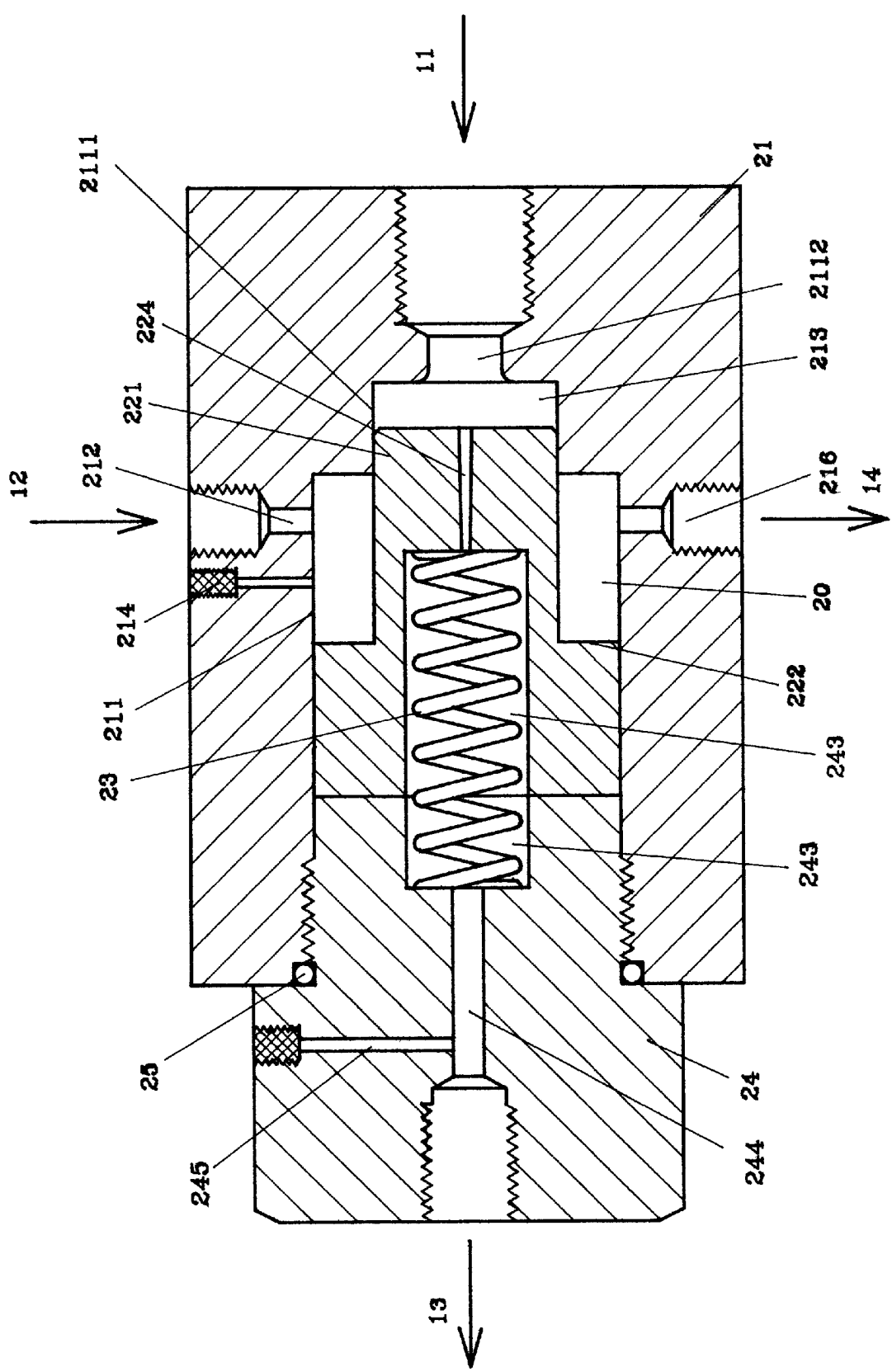
FIG. 16 is a side cross-sectional view of a tenth embodiment of a piston valve in the present invention.

FIG. 16 shows a tenth embodiment of a brake liquid pressure device in the present invention, having a base 21, which is provided with a center circular hollow 211, a smaller diameter recess 2111 than the hollow 211 formed to extend forward from the hollow 211, and a front stage inlet 2112 formed to extend to the rear end of the base 21 to be connected to the first tube route 11. A threaded cap 24 has a spring hole 243 in a rear center portion, a front stage outlet 244 extending backward from the spring hole 243, a leak hole 245 formed in an upper wall and communicating with the front stage outlet 244. A piston 22 has a front small diameter portion 221 fitting movably in the recess 2111, a rear large diameter portion 222 fitting in the hollow 211 so as to form a liquid space 20 between, and a coil spring 23 located in the spring hole 223 of the piston 22 and the spring hole 243 of the threaded cap 24.

Figure 17:
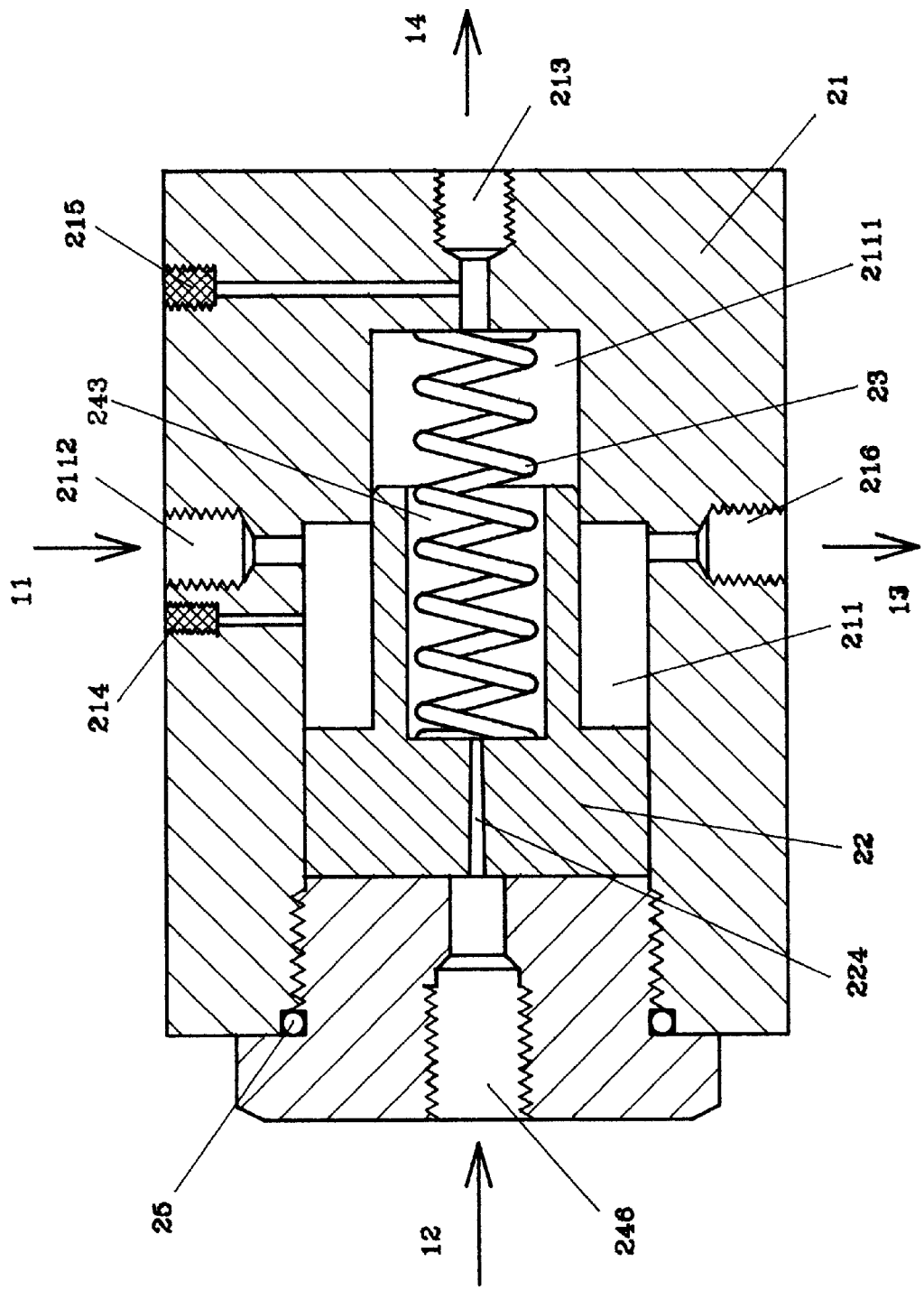
FIG. 17 is a side cross-sectional view of an eleventh embodiment of a piston valve in the present invention.

FIG. 17 shows an eleventh embodiment of a brake liquid pressure device in the present invention, having a base 21, which is provided with a center circular hollow 211, a smaller diameter hole 2111 than the hollow 211 directly behind the hollow 211, a rear stage outlet 213 communicating with the hollow 2111 in a rear wall and a second leak hole 215 communicating with the hole 2111 in an upper surface, a front stage inlet 2112 formed in an upper wall communicating with a rear end portion of the hollow 211, a front stage outlet 216 formed in a lower wall communicating with the rear end portion of the hollow 211, and a leak hole 214 formed in the upper wall communicating with the hollow 211. A piston 22 has a rear small diameter portion 221 provided with a spring hole 243 (223) for containing a spring 23, and a through hole provided to extend from the spring hole 223 to a front end and communicate with a rear stage inlet 246 in a threaded cap 24. The small diameter portion 221 of the piston movably fits in the hole 2111.

Figure 18:
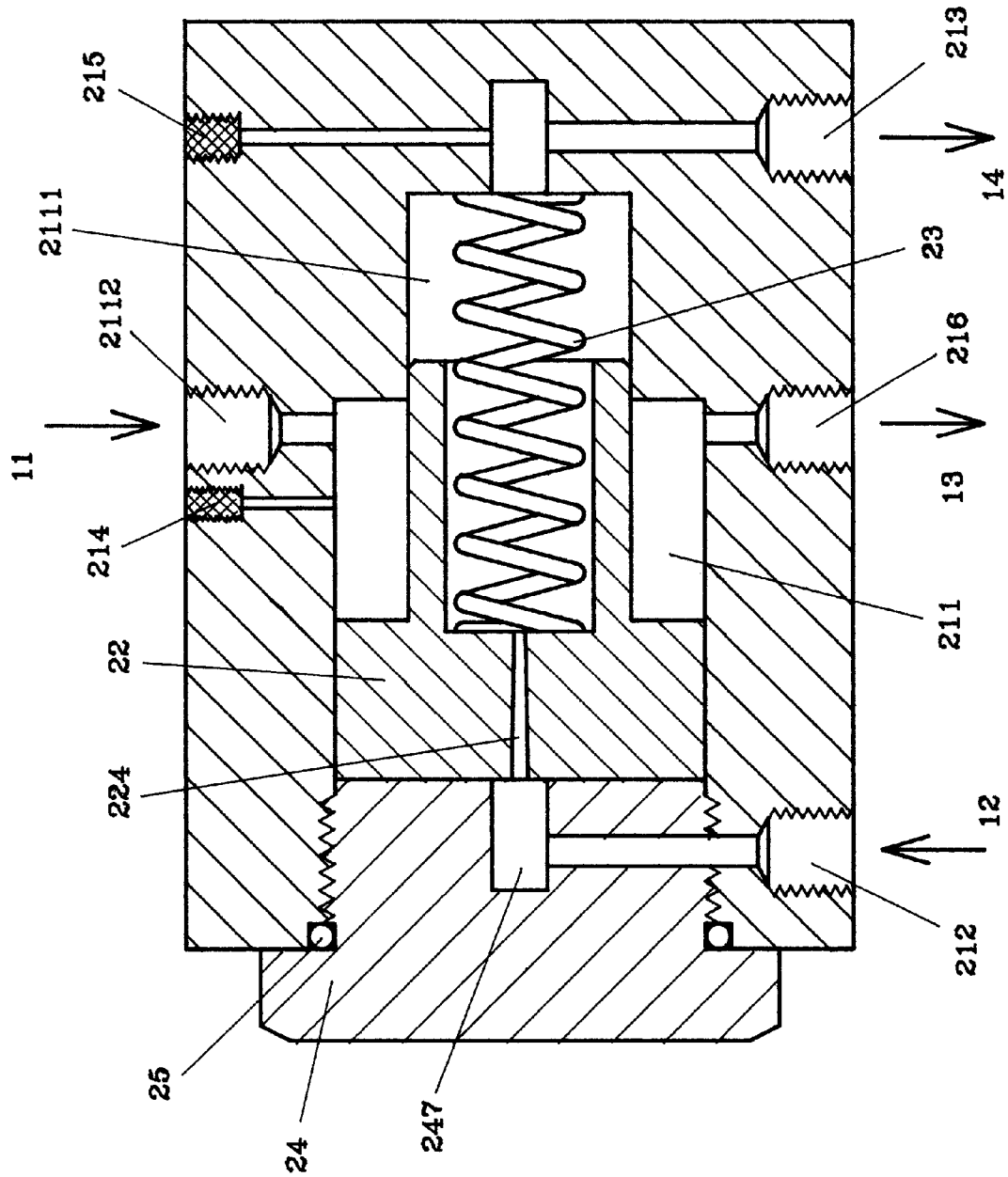
FIG. 18 is a side cross-sectional view of a twelfth embodiment of a piston valve in the present invention; and, FIG. 19 is a side cross-sectional view of a thirteenth embodiment of a piston valve in the present invention.

FIG. 18 shows a twelfth embodiment of a brake liquid pressure device in the present invention, having almost the same structure as the eleventh embodiment except that the rear stage outlet 213 is located in the lower wall of the base 21, and the rear stage inlet 212 is located in the lower surface of the base 21 and communicates with a hole 247 provided in a rear portion of the threaded cap 24.

Figure 19:
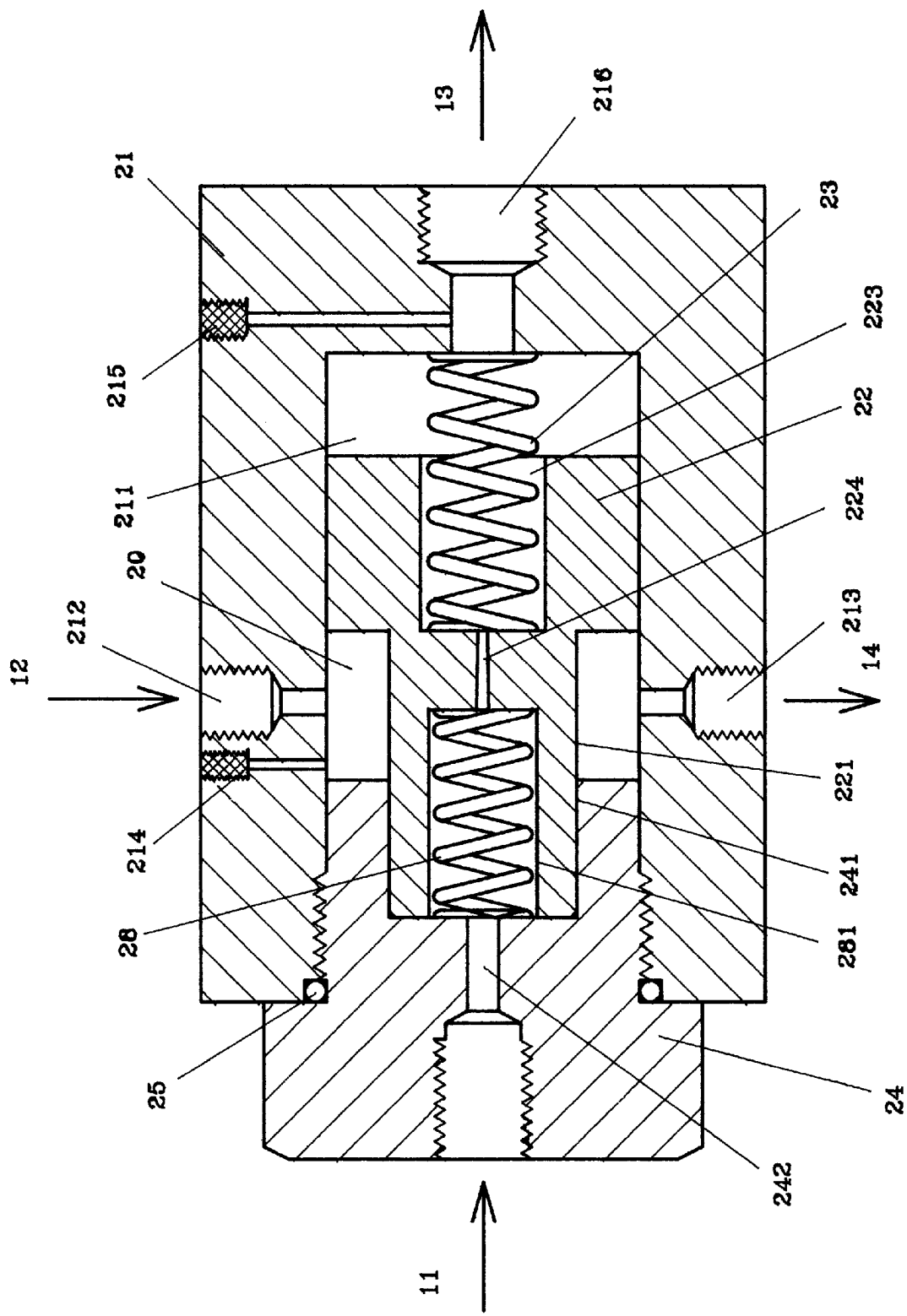

FIG. 19 shows the thirteenth embodiment of a brake liquid pressure device in the present invention, having the same structure as the first embodiment except that the piston 22 has the small diameter portion 221 provided with a spring hole 281 for containing a spring 28 therein so as to increase pressure to the piston 22.

While the preferred embodiments of the invention have been described above and it will be recognized and understood that various modifications may be made therein and the appended claims are intended to cover all such modifications which may fall within the spirit and scope of the invention.

What is claimed is:

1. A brake liquid pressure device comprising a piston valve, said piston valve having a front stage inlet connected with a first main route of a brake liquid pressure main pump and a rear stage inlet connected with a second main route of said brake liquid pressure main pump, a front stage outlet connected to a front brake liquid pressure dividing pump of said first main route, a rear stage outlet connected to a rear brake liquid pressure dividing pump of said second main route, said brake liquid pressure main pump producing liquid pressure when the brake of an automobile is operated, pressure liquid flowing to said piston valve and adding pressure and flow out of said front and said rear stage outlet and through said first main route and said second main route to reach said front and said rear liquid pressure dividing pumps said piston valve consisting of:

a base having a center circular hollow for containing a coil spring and a piston, a threaded cap threadably closing a left opening of said center circular hollow with an anti-leak gasket fitting around said opening, a liquid space formed between said hollow and said piston together with said threaded cap, said rear stage inlet formed in an upper wall defining said hollow, said rear stage outlet formed in a lower wall defining said hollow, a first leak hole formed in said upper wall, said front stage outlet formed in a rear wall communicating with said hollow, and a second leak hole formed in the upper wall and communicating with said front stage outlet;

said piston contained in said base, having a front small diameter portion and a rear large diameter portion, a spring hole formed to have an opening in a rear end of said rear large diameter portion and to extend forward in a half part of said small diameter portion, said front small diameter portion fitting movably in a rear hole of said threaded cap, said rear large diameter portion movably fitting in said center circular hollow of said base, a coil spring contained in said spring hole, a through hole formed in said front small diameter portion and communicating with said spring hole and said front stage inlet in said threaded cap;

said coil spring contained in said spring hole of said piston and having its front end contacting a wall defining a front end of said spring hole and a rear end contacting a wall defining a rear end of said hollow of said base;

said threaded cap having a rear small diameter portion and a front large hexagonal portion, said front stage inlet formed in said front large portion, male threads formed in said rear small diameter portion and engaging with female threads in said hollow of said base with a gasket fitted around said opening of said hollow;

said first and said second leak holes exhausting air in said center circular hollow of said base out when brake liquid flows in said piston base and sealed by said piston pressed to move rearward by brake liquid to push all the air in said piston valve, said brake liquid pressure main pump producing liquid pressure to force brake liquid flow in said piston valve and through said front stage inlet to press and move said front small diameter portion and said rear large diameter portion of said piston so that brake liquid filling the space between said piston and said threaded cap may press said piston to force the brake liquid in the space between said rear large portion and said coil spring flow through said front stage outlet and through said front stage tube route to reach said front stage liquid dividing pump, said front stage route thus performing braking action by means of said piston swiftly increasing pressure, said brake liquid main pump continuing to produce pressure to let brake liquid flow through said front stage inlet through said through hole of said piston and into said spring hole in case that said front stage liquid pressure dividing pump gets the necessary volume of brake liquid for braking but said rear liquid dividing pump did not have enough volume for braking, said coil spring recovering resilience to press back said piston forward to its original position when said front stage pressure dividing pump gets the necessary volume of brake liquid so that the brake liquid in said liquid space may quickly flow back in the rear stage tube route through said rear stage outlet to perform braking said front stage of wheels at first and then both said front stage and said rear stage of wheels synchronously next and thus shortening the distance of braking.

2. The brake liquid pressure device as claimed in claim 1, wherein said center circular hollow of said base has a rear end wall provided with a hole in its center part, said second leak hole is formed in an upper wall of said base and communicating with said hole, and said front stage outlet is formed in a lower wall of said base and communicating with said hole.

3. The brake liquid pressure device as claimed in claim 1, wherein said leak holes are provided in the upper wall of said base and said front stage outlet is provided in a lower wall of said base, both said leak holes and said front stage outlet communicating with said center hollow of said base, said piston having a small diameter tube fixed on a rear end, a chamber formed between said small diameter tube together with said large diameter portion of said piston and said center hollow, and a groove is provided between an outer edge of said small tube and said spring hole for communicating said spring hole with said chamber.

4. The brake liquid pressure device as claimed in claim 3, wherein said second leak hole is provided in the upper wall of said base and said front stage outlet is provided in a lower wall of said base, both of them communicating with said center hollow of said base, said piston having a small tube fixed on a rear end, a chamber formed between said small diameter tube together with said large diameter of said piston and said center hollow, and a through hole formed between the outer edge of said small diameter tube and said spring hole for communicating said spring hole with said chamber.

5. The brake liquid pressure device as claimed in claim 4, wherein an annular groove is formed in a rear end of said center hollow, communicating with said second leak hole and said front stage outlet, a groove formed in a rear end surface of said piston for communicating said spring hole with said annular groove.

6. The brake liquid pressure device as claimed in claim 5, wherein an annular groove is formed in a rear end of said center hollow, communicating with said second leak hole and said front stage outlet, and a through hole formed in said rear end of said piston for communicating said spring hole with said annular groove.

7. The brake liquid pressure device as claimed in claim 1, said second leak hole is located in an upper wall of said base above said rear end of said center hollow, said front stage outlet located in a lower wall of said base below said rear end of said center hollow, a cap-shaped pad provided to fit in said rear end of said center hollow and has a spring recess in its center part for a rear end of said coil spring to fit therein, said pad and said center hollow defining a chamber, and a vertical through hole formed in said pad for communicating said spring hole with said chamber.

8. The brake liquid pressure device as claimed in claim 1, wherein a spring recess of a smaller diameter than that of said center hollow is formed in a wall defining said rear end of said center hollow for the rear end of said coil spring to fit therein, communicating with said second leak hole and said front stage outlet.

9. The brake liquid pressure device as claimed in claim 1, wherein said second leak hole is located in the upper wall of said base, said front stage outlet located in the lower wall of said base, said second leak hole and said front stage outlet communicating with each other, a disc provided to fit in the rear end of said center hollow and having a center through hole, said disc having a front bar with a smaller diameter than said disc extending forward from its center portion to fit in said coil spring, a rear end of said through hole of said disc communicating with said front stage outlet by means of a groove.

10. The brake liquid pressure device as claimed in claim 1, wherein said front stage inlet is formed in a rear wall of said base, a smaller diameter hole provided in a wall defining the rear end of said center hollow and communicating with said front stage inlet, said threaded cap having a rear spring hole and front stage outlet communicating with said rear spring hole, and a a leak hole provided in an upper surface of said threaded cap and communicating with a hole communicating said front stage outlet with said rear spring hole, said small diameter portion of said piston fitting in said spring hole, said large portion of said piston fitting in said center hollow, a liquid pressure space formed between said piston and said center hollow, and said coil spring contained in said spring hole of said piston and said rear spring hole of said threaded cap.

11. The brake liquid pressure device as claimed in claim 1, wherein a smaller diameter hole than said center hollow is provided in a wall defining the rear end of said center hollow, said smaller diameter hole communicating with said second leak hole in the upper wall of said base and with said front stage outlet in the rear wall of said base, said front stage inlet located in the upper wall of said base, said front state outlet located in the lower wall of said base, said first leak hole located in the upper wall of said base, said smaller diameter portion of said piston having a spring hole for containing said coil spring, said large diameter portion of said piston having a through hole communicating with said rear stage inlet in said threaded cap, said smaller diameter portion of said piston movably fitting in said smaller diameter hole.

12. The brake liquid pressure device as claimed in claim 1, wherein a smaller diameter hole than said center hollow is provided in a wall defining the rear end of said center hollow, said smaller diameter hole communicating with said second leak hole in the upper wall of said base and with said rear stage outlet in the lower wall of said base, said front stage inlet located in the upper wall of said base, said front stage outlet located in the lower wall of said base, said first leak hole located in the upper wall of said base, said smaller diameter portion of said piston having a spring hole for containing said coil spring, said spring hole having a through hole, said rear stage inlet located in the lower wall of said base under said threaded cap and communicating with a through hole in said threaded cap, said through hole in said threaded cap communicating with said through hole of said piston.

13. The brake liquid pressure device as claimed in claim 1, wherein said piston has a spring hole respectively in said small diameter portion and in said large diameter portion for containing a separate coil spring.

* * * * *